United States Patent [19]

Bussard

[11] Patent Number: 5,314,767
[45] Date of Patent: May 24, 1994

[54] HOLOGRAPHIC PRODUCTS WITH IMPROVED SEALS

[76] Inventor: Janice W. Bussard, 201 N. Fruitport Rd., Spring Lake, Mich. 49456

[21] Appl. No.: 14,370

[22] Filed: Feb. 5, 1993

Related U.S. Application Data

[63] Continuation-in-part of Ser. No. 883,285, May 14, 1992, which is a continuation-in-part of Ser. No. 647,512, Jan. 28, 1991, abandoned, which is a continuation of Ser. No. 292,826, Jan. 3, 1989, abandoned, which is a continuation-in-part of Ser. No. 147,492, Jan. 25, 1988, Pat. No. 4,838,965.

[51] Int. Cl.$^5$ .............................. B32B 31/02
[52] U.S. Cl. ........................ 430/1; 359/2; 156/251; 156/515
[58] Field of Search ............ 430/1, 2; 359/1, 2; 156/515, 251; 283/77, 904, 86, 85

[56] References Cited

U.S. PATENT DOCUMENTS

| | | |
|---|---|---|
| 3,733,258 | 5/1973 | Hanak et al. |
| 3,971,299 | 7/1976 | Whittle et al. ................. 156/515 |
| 4,131,503 | 12/1978 | Plate ................................. 156/510 |
| 4,160,685 | 7/1979 | Kuroda ............................ 156/251 |
| 4,208,231 | 6/1980 | Hoppe et al. .................... 283/904 |
| 4,414,051 | 11/1983 | Bose .................................. 156/515 |
| 4,684,795 | 8/1987 | Colgate, Jr. ......................... 430/2 |
| 4,758,296 | 7/1988 | McGrew ........................... 156/231 |
| 4,856,857 | 8/1989 | Takeuchi et al. ................. 283/904 |

FOREIGN PATENT DOCUMENTS

| | | | |
|---|---|---|---|
| 62-119570 | 5/1987 | Japan ................................ 430/2 |
| 1264568 | 2/1972 | United Kingdom ............. 156/515 |

Primary Examiner—Charles L. Bowers, Jr.
Assistant Examiner—Martin J. Angebranndt
Attorney, Agent, or Firm—Joseph K. Andonian

[57] ABSTRACT

An improved process for cutting and simultaneously sealing the cut edges of holographic materials comprising cutting with a hot cutting tool. Suitable cutting tools include a steel rule die, a hot tipped cutter, and a laser. The resulting product can be attached easily to a substrate and will resist delamination even when attached to a substrate such as a textile material that will be subjected to ordinary washing and drying.

21 Claims, 2 Drawing Sheets

HOLOGRAPHIC PRODUCTS WITH IMPROVED SEALS

CROSS-REFERENCE TO PREVIOUS APPLICATIONS

This application is a continuation-in-part of my co-pending application Ser. No. 883,285 filed May 14, 1992, which was a continuation-in-part of then copending, now abandoned, application Ser. No. 647,512 filed Jan. 28, 1991, which application was a continuation of my then co-pending, now abandoned, application Ser. No. 292,826 filed Jan. 3, 1989, which application was a continuation-in-part of my then co-pending application Ser. No. 147,492, entitled "HOLOGRAPHIC ART APPLIED TO T-SHIRTS OR OTHER TEXTILE PRODUCTS", filed Jan. 25, 1988, now U.S. Pat. No. 4,838,965, issued Jun. 13, 1989.

TECHNICAL FIELD

This invention relates to processes for sealing the edges of holographic materials (such as holograms or diffraction gratings) with hot cutting tool means and the moisture and abrasion resistant products produced thereby. The products of the invention are particularly suitable for affixing to substrates that will be exposed to considerable wear and tear during use, such as brought about by repeated washing and drying, over the useful life of the substrates (especially clothing).

BACKGROUND PRIOR ART

Holography has been used widely in a variety of applications to reproduce three-dimensional images. U.S. Pat. No. 4,589,686 describes usage for anti-counterfeiting purposes such as on credit cards, probably the most widely recognized use at the present time. The same patent also discloses many other patents relating to diffraction grating patterns and three-dimensional images of objects and scenes. The cover of the National Geographic issue of March, 1984, is another example of use to increase the attractiveness of the magazine to the naked eye. The same issue of the National Geographic contains a good description of holography.

The first successful use of holographic materials on fabrics was originally disclosed in my parent application Ser. No. 147,492 filed Jan. 25, 1988, now U.S. Pat. No. 4,838,965. Since that time two other applications have been filed on behalf of another inventor claiming a different method of attaching holograms to textile wearing apparel. These applications have issued as U.S. Pat. Nos. 4,956,040 and 5,073,222. These methods achieve resistance to repeated washings by enveloping a precut hologram between a clear polyester coating and an adhesive scrim backing and then adhering the resulting laminate to wearing apparel with the adhesive in the scrim. The addition of a separate polyester layer on top of the hologram and scrim underneath adds two layers which reduce flexibility and increase stiffness in a product where a "soft hand" is highly preferable. In addition the separate polyester layer of this pouch or envelope that is not embossed interferes with the clarity of the holographic image.

The holograms and diffraction gratings disclosed in my U.S. Pat. No. 4,838,965 as well as those manufactured and sold today for application to various substrates are multi-layered products. Although other layers may be present depending on the manufacturer, all of these products contain an embossed plastic carrier, a reflective intermediate surface or later, and an adhesive backing. For present purposes the adhesive material is generally activated by heat and pressure to attach the holographic materials to appropriate substrates and is generally referred to as an iron-on adhesive. The embossed surface of a metallized plastic carrier actually reproduces the three-dimensional image or pattern when light is reflected through the transparent plastic by the metallic layer. This means of reproduction is most commonly referred to as embossed holography. A more complete description can be found in Chapter 9 of Holography Marketplace, Ross Books, March, 1991. These holograms and diffraction gratings are generally available in sheets of film or foil bearing images or patterns on a repetitive or continuous basis throughout their length and breadth. The sheets are at least six inches wide and are usually sold in rolls up to two hundred feet long. The purchaser can cut the images or patterns out of the sheets to suit his needs. For example, the hologram of the Golden Gate bridge depicted in my U.S. Pat. No. 4,838,965 would be repeated throughout a commercially available sheet bearing many reproductions of that holographic image. The purchaser can cut each image of the bridge out of the sheet and attach it to whatever substrate he deems appropriate for his purposes. For example, such holograms can be affixed by the mechanized hot stamping process to the paper cover of a magazine such as the above National Geographic issue while the manual pressure sensitive process would be suitable for small quantities.

Strictly speaking, a diffraction grating or the related micro-etching or color explosion are not holograms but the commercially available versions employ the same multi-layered structure as an embossed hologram. The purpose of such products is to create the illusion of depth and motion as light is diffracted from the surface of the material without the prohibitive expense of originating holographic master plates. Diffraction grating requires a master grating to make a die which produces a replica of the grating in the metalized film. Microetching transfers line art or a continuous tone photograph to a master die for creating an image by using graphic screens. The color explosion employs what is known in the graphic arts industry as stepping to include drop down, side step, dimensional side step, rotation in varying degrees and back up. These techniques enable the customer to choose from a wide variety of options to achieve different visual effects. The multilayered structure in all products requires a layer of adhesive on the back for protecting the reflective layer as well as the adhesion characteristic necessary for bonding to various substrates with heat and pressure. Since the problems associated with the structure all these holographic materials are essentially the same with or without attachment to a substrate, they are considered to be equivalents of the hologram for purposes of the present invention. The word "holographic" when used in this specification in combination with words such as "products", "materials" or "films" can be taken to include holograms, diffraction gratings, microetchings, color explosions or any other light reflecting product having the same multi-layered structure.

Another more recent development in the holography industry involves a demetalized holographic foil suitable for application to various substrates requiring limited laundry or dry cleaning. This structure eliminates approximately 78 to 80% of the reflective metal layer.

The resulting product reflects subtle pastels creating a fashionable yet less metallic look with a glamorous appearance. When paired with a appropriate double-sided adhesive coated heat sealable film, it becomes a heat transfer foil. Presently Sealtran Corporation, Chicago, Ill., 60614 manufactures this double-sided adhesive coated film known as AS as an attractive laminated pouch for drivers licenses, bus posses and other letter size envelopes or pouches. For the purpose of this invention this same material can add a decorative accent to textiles and other substrates by using it as a cold peel heat transfer foil or integrating it into a heat transfer design. The concept of transfers is not new but using demetalized or other holographic materials with sealed edges alone or as a component of the design is new. This material can be used as the sole decoration on fabric by placing the desired shape of the demetalized holographic material in registration with the same shape of the double-sided adhesive coated film on the fabric with the textile adhesive side in contact with the fabric and the AD adhesive side in contact with the holographic material. This completed assembly is covered with silicone paper and sealed in place by a heat press with medium pressure and a temperature of about 300 degrees Fahrenheit for about 8 seconds. After cooling the paper is peeled away exposing the metalized holographic imagery. Although fragile to various environmental conditions, it can withstand limited washings if hung to air dry. The finished product offers the customer an enhanced focal point with drawing power.

Security devices such as the Visa and Mastercard credit cards displaying reflective holograms have been used for approximately nine years and although they still have security value provided by the integrated hologram, the current trend is toward the use of clear holography on credit cards offering transparency with greater reflectivity. These holograms are comprised of a multi-layered material to include a synthetic carrier, a sandwiched reflective layer and an adhesive back. However the interposed reflective material is not metalized but a complex, silicone-based chemical compound with provides an optical coating. Although presently expensive as a security measure, a clear hologram permits the viewer to see imagery, numbers, letters or symbols on the substrate to which it is attached thereby providing another security capability for the security industry. The reflective sandwiched layer, regardless of its composition, requires protection from damaging environmental forces. This can be accomplished by sealing the edges. The equipment making clear holography possible is manufactured by Datacard in Havant, UK and Holland and marketed as recently as October, 1992.

While the prior art provides holographic materials for attachment to substrates, it does not provide such materials that can be readily and inexpensively attached to substrates that will be exposed to the strenuous conditions of ordinary use. Even ordinary environmental insults such as rain, humidity, heat, cold, and wind will after a period of time affect the quality of the embossed surface if not protected by sealing the edges. Holographic products are especially unsatisfactory for attachment to clothing which will be repeatedly subjected to washing, drying and even dry cleaning. Even my earliest processes for dealing with this problem, although advancements over the prior art of their day, were more cumbersome and expensive and the edges of the resulting products were not sealed as consistently as would be desirable.

OBJECTS OF THE INVENTION

A principal object of the present invention is to provide improved processes for producing holographic materials which can be easily affixed to water permeable or impermeable substrates in a manner which will resist separation or damage even after complete and repeated immersion and agitation in water.

Another object of the present invention is to provide an improved interfaced assembly characterized by a soft hand and comprising an embossed transparent plastic carrier layer, a reflective layer, a water impermeable adhesive layer, and an improved impermeable seal at the perimeter which resists separation of the assembly after repeated laundering and dry cleaning more effectively than previously available products.

Still another object of the present invention is to provide holographic materials with enhanced visual features brought about by various decorative processes such as printing, sublimation, flexography, and thermal transfer printing.

A still further object of the present invention is to provide more economical processes for the production of a more varied and more elegant collection of holographic materials for application to substrates which will be subjected to considerable wear and tear especially in the presence of water.

Other objects of the present invention are to provide protective seals for such newer holographic materials such as demetalized holographic foils, clear holography and all other reflective surfaces sandwiched between a clear plastic top layer and an adhesive bottom layer.

Still other objects will become apparent to those skilled in the art by the disclosure that follows.

DISCLOSURE OF THE INVENTION

The present invention addresses the prior art problem of unsatisfactory holographic products and processes for attachment to substrates that will be subjected to considerable wear and tear in ordinary usage. It reduces the potential for damage to such products through ordinary wear and tear by more effectively and economically sealing the edges during the normally required cutting portion of the process of producing such products in anticipation of their attachment to substrates.

The present invention provides improved holographic products suitable for application to fabrics and other substrates that are subjected to considerable wear and tear in ordinary use, such as that resulting from repetitive washing and drying throughout their useful lives, and methods for producing such products. Especially because these improved holographic materials are suitable for use on washable fabrics, the present invention also makes it practical to combine holographic art in various forms with printed graphics and other color and design enhancements on fabric substrates. As shown in my earlier applications, without appropriate modification these commercially available, multi-layered materials will delaminate and deteriorate rapidly enough to make such use impractical. Most often the top layer of the holographic material will separate by abrasion and/or by penetration with water between the layers and the three-dimensional or iridescent effect will deteriorate significantly or be lost completely. Likewise without a suitable adhesive the holographic material will separate wholly or partly from the substrate. The adhesive should not only protect the embossed surface of the holographic material but also firmly attach the holographic material to the substrate over the life of the resulting assembly. Since the substrate is not always completely smooth, as is the case with porous woven fabrics, it is also important that the adhesive provide a suitable surface for engagement with the holographic materials. Otherwise the reflected holographic image or pattern will be distorted by the irregularities in the porous substrate. The present specification describes further improvements at the edges or perimeter of holographic materials to make them much more impervious to delamination than was previously possible. The present specification also provides further enhancements in the associated graphics to create an even more dramatic visual effect than that emanating from the holographic materials per se.

The plastic layer of these commercially available holographic and diffraction grating films is most commonly a thermoplastic polyvinylchloride (PVC) but polyester is also used. It should be thin enough to be completely transparent and substantially pliable and yet tough and moisture impervious enough to protect the holographic materials from deterioration by exposure to moisture and abrasion. Polyethylene, vinyl and polypropylene are also acceptable and may be superior in some respects. This plastic layer usually varies in thickness from 0.075 to 0.20 mm. Other films with varying properties that can be used are described in Kirk-Othmer's Encyclopedia of Chemical Technology, Third Edition, John Wiley & Sons, 1978, beginning on P. 227 of Volume 10. Of particular importance for present purposes are the following characteristics: transparency, water or moisture impermeability, thermal properties capable of withstanding the conditions of manufacture and use, memory (i.e., the ability to retain an embossed surface) and resistance to abrasion.

A suitable adhesive backing is a moisture impermeable thermoplastic which is usually characterized commercially as an "iron-on" adhesive. These adhesives are predominantly polyester or polyacrylic in character and require heat and pressure to activate. Adhesives that are chemically cross-linked and bond readily to fabrics when activated are also useful for the present invention as more completely described in my copending application Ser. No. 883,285.

The hologram image and the diffraction grating or micro-etching pattern in these products is generally stamped with a stamping die or shim into a thin mirror-like metallic foil vacuumized to one side of a plastic carrier material. When light passes through the plastic carrier, it is reflected back through the plastic by the metal foil in a diffused pattern to display the three-dimensional holographic image or embossed diffraction grating or other related light reflecting products that can be produced from the plastic-metal sandwich. The metal foil generally consists of aluminum which is never altered in color. Holographic foil can be colored by (1) adding a tint or dye lacquer coat over the top of the polyester carrier, (2) using a tint or dye to color the polyester during its manufacture, (the only practical option for bonding to fabrics) or (3) adding a lacquer tint or dye as a separate layer between the polyester carrier and the metal foil. Additional layers of various materials are also commonly found in these holographic products. However, the only critical materials for purposes of the present invention are the embossed carrier layer, the reflective layer and the adhesive bottom layer which in combination reflect a three-dimensional image or iridescent pattern in the presence of light and permit appropriate attachment to substrates. Desirable enhancements of the reflected design or pattern can be achieved by various known techniques such as color explosion combined in various ways with micro-etching. Other decorative techniques include overprinting, sublimation, flexography and thermal transfer printing.

Instead of embossing the holographic image or diffraction grating into a metal-backed plastic carrier, the plastic carrier itself can be embossed and the metal coating can be deposited on the embossed surface afterwards. Further information on processes for making embossed holograms can be found in U.S. Pat. No. 4,913,504.

Although in the most preferred embodiment of the product of the present invention an intermediate metallic or nonmetallic reflective layer is desirable, it is not absolutely necessary. Instead the underside of the plastic top layer can be embossed in the desired pattern and the adhesive layer added. It is still necessary to seal the cut edges of this two layered product to resist delamination of the assembly and deterioration of the embossed surface. Thus the bare bones product embodiment of the present invention consists essentially of a plastic top layer, an adhesive bottom layer and an intermediate embossed surface on the underside of the top layer with its cut edges sealed by a hot cutting tool means. The bare bones process embodiment of the present invention consists essentially of cutting and simultaneously sealing the cut edges of such products in their desired outlines with hot cutting tool means. It not clearly understood why or how the a hot cutting tool forms such a complete seal between the dissimilar layers that make up the holographic assembly. Surprisingly the process simply works.

A more complete description of suitable holographic materials, the substrates to which they can be affixed, and the graphics and decorative enhancements with which they can be combined can be found in my co-pending application Ser. No. 883,285 filed May 14, 1992, and its predecessors which are incorporated herein by reference. Those parent applications also describe in considerable detail how the edges of the layered holographic materials can be sealed, both with adhesives and by cutting with a mechanical hot-tipped cutter.

The present application adds two other cutting and sealing processes to provide further improvements in the product, especially in the seal at the perimeter of the product, and processes for producing the product.

The new processes employ cutting with a heated die and cutting with a laser beam. Like cutting with a hot tip, these new processes also employ heat to perfect the seal during the cutting process. However, they do so more economically and at a much faster rate than earlier processes. Like cutting with a hot tip using a computer controlled machine, lasers can also cut complex shapes and patterns. Die cutting, especially steel rule die cutting, is better suited for cutting simpler patterns preferably having curvilinear outlines—such as circles, ovals or rectangles with curved corners—especially when large volume production of a particular shape is desired. In addition to economical production of complex outlines in large numbers, laser cutting also produces the best seal and the smoothest edge with a minimum of waste and clean up effort. A smooth edge that lacks burrs is not insignificant for uses that will necessarily and frequently come in contact with human skin, such as on clothing.

My original invention consisted of attaching commercially available holograms to fabrics (especially T-shirts), integrated into screen printing inks, by heat and pressure to seal the edges of the hologram with adhesives and provide a water impermeable interface between the hologram and the fabric. My copending parent application Ser. No. 883,285 disclosed other methods of sealing the edges of a hologram or diffraction grating without using adhesives. One example is using hot cutting equipment with interchangeable templates positioned to cut holographic material thereby sealing the edges in one operation. That application also disclosed the use of a mechanical flatbed computerized machine to cut and seal the edges of holographic materials with a heated iron tip. The machine is marketed by Stahl's, 20602 Stephens Drive, St. Clair Shores, Mich. 48080, under the trademark TEXICUT. This discovery was the first use of heat to help seal the edges of holographic materials. Holographic materials cut with this machine proved to be more resistant to separation and deterioration after repeated washing and drying cycles than holographic materials whose edges were sealed with adhesives. The use of the TEXICUT machine also made it possible for precut and sealed holographic materials per se to be marketed directly to the consumer market and small screen printers and retail establishments for bonding to various substrates with simple heat transfer machines and even household irons.

The use of the hot tipped cutter also made it possible to mechanize completely the process of producing holographic materials interfaced to various substrates by visually scanning artwork electronically, transferring the imagery into a CPU which is exported to a disk to a numerical file (called digitizing). The disk is now ready for use in the TEXICUT. The addition of processes utilizing a heated die and a laser beam, disclosed for the first time in the present application, provided even greater flexibility in processing holographic materials to the greatest advantage.

In the process of the present invention, the edges at the perimeter of holographic products produced are sealed before attachment to substrates. By separating the sealing operation from the process of attaching the holographic materials to a substrate, the process of attachment is greatly simplified. An ordinary heat transfer machine such as any retail T-shirt store would possess or even a household iron can be used to attach the holographic materials to a substrate.

BRIEF DESCRIPTION OF THE DRAWINGS

FIGS. 1 and 2 are not drawn to scale and are merely pictorial representations of the essential features of the product of the present invention.

MORE DETAILED DESCRIPTION OF THE PREFERRED EMBODIMENTS

Figure 1:
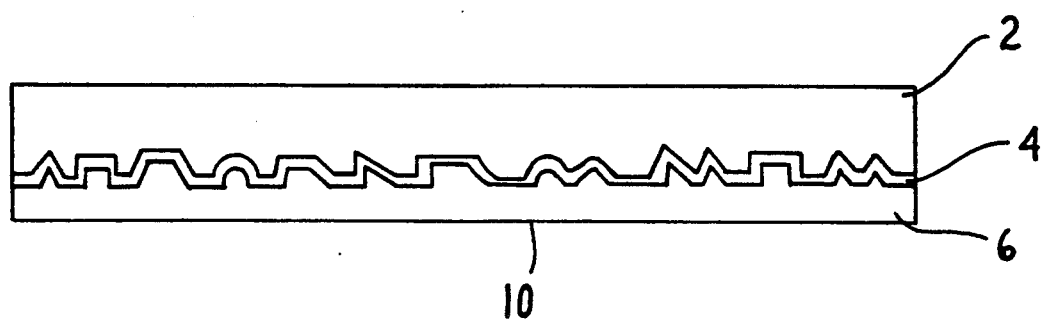
FIG. 1 is a greatly enlarged cross-sectional view of embossed holographic material if no attempt had been made to seal the edges along the perimeter of the hologram.
Figure 2:
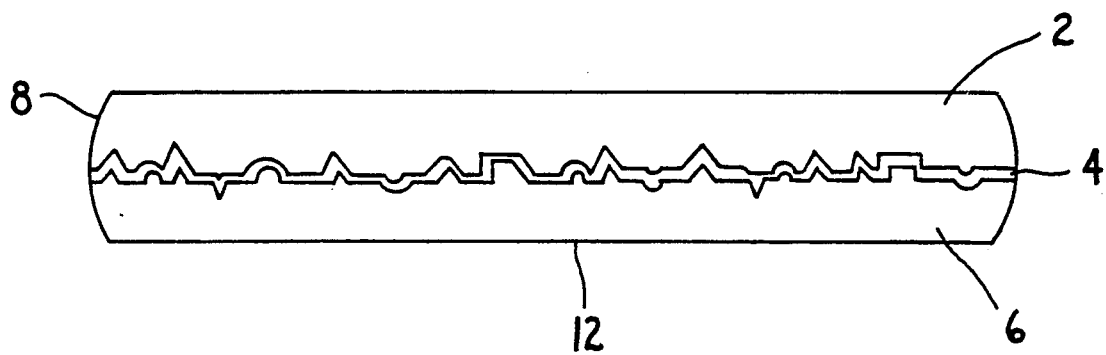
FIG. 2 is a cross-sectional view of a hologram whose edges have been sealed by cutting at an elevated temperature and thereby fusing the edges together in a very narrow band.

The preferred product of the present invention is illustrated in FIG. 2 of the drawings. The hologram 12 depicted there comprises an embossed plastic carrier 2, a mirror-like metallic backing 4, an adhesive layer 6 and a sealed edge 8 which is moisture impervious. Any other product utilizing an embossed surface or other related light reflecting process to display an iridescent pattern instead of a hologram through the plastic top layer and intended for attachment to a substrate would have the same essential structure and is included within the scope of this invention. When this embodiment is attached to a substrate, less time, effort and equipment is required to achieve the desired degree of resistance to moisture and abrasion. FIG. 1 differs only in the absence of a sealed edge. When exposed to water this product will delaminate especially when attached to clothing which is subjected to repeated washing and drying. The top layer 2 will soon separate from the other two layers 4 and 6 exposing the embossed surface to abrasion and thereby distorting the embossed surface and spoiling the reflected image or pattern.

Figure 3:
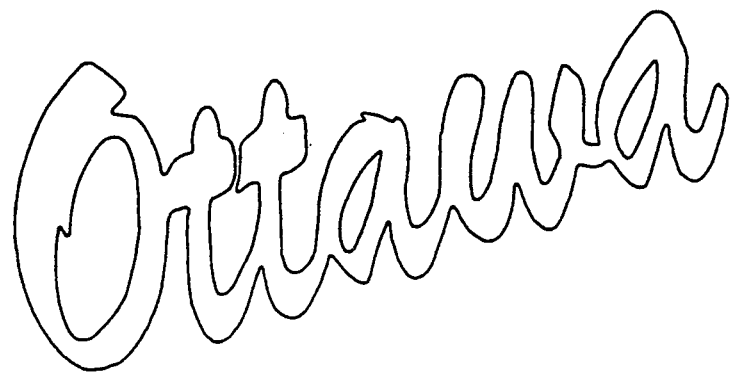
FIGS. 3, 4 and 5 are frontal views of holographic material with complex shapes which are best cut and sealed with lasers or hot tipped cutters.
Figure 4:
Figure 5:
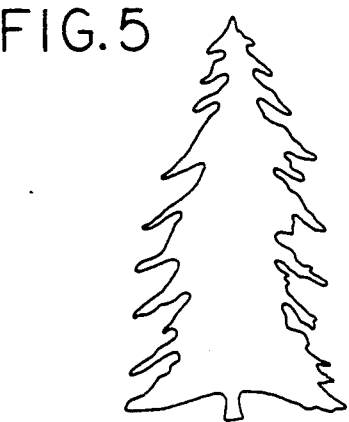

The previously described TEXICUT machine can be used to cut and seal the edges of the holographic materials simultaneously. The machine can be programmed to cut holographic materials in complex shapes and sizes such as shown in FIGS. 3, 4 and 5 by first scanning the artwork with a computer and a scanning program such as Photo Finish. The image is then traced automatically using Adobe Streamline followed by digitization of the image with a Conversion program and copying onto a disk. The disk is inserted into the TEXICUT machine, the basic commands are keyed into its control panel to indicate the desired size, quantity and choice of one or two colors. Finally the holgraphic material is tacked down on the flatbed and the iron tip of the machine slowly outlines, cuts and seals the edges of the holographic material in sizes ranging from ½ to 12 inches in height simultaneously. After picking the cut and sealed holographic material off the flatbed and weeding (i.e., removing the waste material), the products are ready for attachment to substrates such as T-shirts as described in my copending application Ser. No. 883,285 or even more simply by do-it-yourselfers with a household iron. Heat of approximately 330 degrees Fahrenheit for about 8 seconds is sufficient for such attachment.

Cutting, and simultaneously sealing the edges of, multi-layered embossed holographic materials to form simple shapes and sizes, such circles and rectangles (preferably with rounded corners), in large quantities can be accomplished economically by utilizing a heated steel rule die. Steel rule die cutting is an old industrial art described on pages 6–25 to 6–28 of the *Tool and Manufacturing Handbook*, Fourth Edition, Volume II, Forming, Society of Manufacturing Engineers, 1954. These dies are sometimes referred to as cookie cutter or low cost dies. The dies are constructed of low-cost materials and take little time to make. For purposes of the present invention, single-element dies (i.e., dies consisting of a die section without an opposing punch) are preferred. After mounting the steel rule possessing a sharp edge and a blunt edge bent or formed to the outline of the desired holographic product, the sharp edge is operated against a flat hard platen overlaid by a sheet of the holographic material to be cut Three major factors are involved in cutting and sealing holographic materials: the composition of the board used as a base for the steel rule die, the temperature to which the die is heated and the dwell time in the cutting process. Suitable materials for the base are Permaplex, ABO and Phenolic, all of which are available commercially and are capable of withstanding the heat required to seal the edges. A flexible steel rule having a blunt edge and a sharp edge is bent into the outline shape of the desired product and press fitted into a matching slot cut into the board until it is flush with the top surface of the board. A suitable board is ⅝ inches thick. A suitable steel rule is ⅛ inches wide and approximately 1/32 inches thick at its blunt edge. Thus the sharp edge of the steel rule would extend ¼ inches below the bottom surface of the board. A ½ inch thick silicone pad can be placed in the cavity formed by the exposed edges of the steel rule to eject the cut blank of holographic material when the die retracts to complete the cutting operation.

Figure 6:
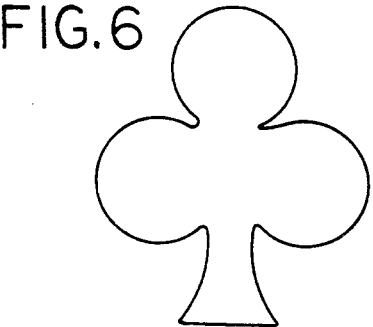
FIG. 6 is a frontal view of holographic material with a simpler shape which can be cut and sealed with a steel rule die.

FIG. 6 illustrates a shape that may be as complex as a steel rule die can effectively cut.

The cutting operation is carried out in a large freestanding press with the preheated die mounted in its upper chamber. A suitable temperature for heating the die is approximately 470 degrees Fahrenheit. To assure quality output and long life for the die, the die must be mounted securely and operated within close tolerances. The mounted die descends electrically or hydraulically upon the holographic material placed on the solid flat lower platen for a dwell time of approximately two seconds to cut and seal the edges of the holographic material in the desired shape. The holographic material can be fed manually or from web to web into the press. The resulting blank will protect its embossed surface from exposure to moisture or abrasion even after attachment to clothing and subjected to as many washing and drying cycles as clothing is subjected to during its useful life. The process itself can cut and seal economically, accurately, efficiently and rapidly. The principal disadvantage of the process is its limitation to relatively simple shapes or outlines of the finished product. The cut edge is also not as smooth as the other techniques disclosed herein, especially the laser process. The previously described hot tip cutter is more suitable for more complex shapes such as Christmas trees or Old English lettering.

The most preferred process of the present invention is laser machining. This process combines the ability to cut complex shapes with economy, speed, accuracy, efficiency and a superior edge. The laser cut edges of the finished product are not only completely and consistently sealed, they are smooth and even and are cut with less waste. The word laser is an acronym for light amplification by stimulated emission of light. Industrial applications of lasers are now commonplace and their use in cutting operations is well established. Their use for cutting holographic materials for sealing purposes is new. The $CO_2$ and Nd:YAG are the two most commonly used industrial material processing tools.

For purposes of the present invention, the $CO_2$ is preferred. The $CO_2$ lasing medium is a flowing gas mixture of helium, nitrogen and carbon dioxide which emits a 10.6 micron wavelength of coherent light which is the same wavelength as heat. Its advantages for cutting holographic materials are many. The laser is a cutting source with a single very small point (0.001 inch to 0.020 inch diameter) allowing for very narrow cut widths. The point can also be moved in any direction unlike the fixed position of a die cutting edge. The laser is a forceless process which can cut flimsy materials with no support. The laser beam is always sharp. The laser also works well in conjunction with computer numerical controls since the energy in the focused point can be controlled easily and moved in any direction.

Thus in the preferred process of this invention, artwork is scanned, exported to a disk holding many files, converted numerically, and imported to standard $CO_2$ laser machining equipment which, when activated with a preferred beam diameter of 0.013 inch, cuts easily at high speed. Speed of cutting is limited only by the power available from the laser. Laser cutting, generally as well as for present purposes, provides a very small heat-affected zone compared to heated die cutting. Suitable basic equipment to carry out the foregoing laser machining operations on a small scale includes a General Scanning DE 2000 Galvo, a 286SX computer, a Trumpf TLF 750 $CO_2$ Laser, a Down collimator with lenses, a beam switch and a laser firing circuit. Blocks, tubing and clamps would also be employed. More sophisticated equipment would be required for large scale production. Those with ordinary skill in the laser machining art would be able to carry out the process and produce the products of the present invention utilizing information existing in the known laser art.

Industrial lasers, such as the $CO_2$, allow a very large amount of energy to be focused on a small, well-defined spot. The laser heats, melts or vaporizes materials only where it is guided by its computer controls. For present purposes as well as generally, laser machining provides a fast, clean process, simple in tooling. It produces a clean edge with little burring, close tolerances and no tool wear. Thus the finished product provides holographic imagery in complex shapes (as illustrated in FIG. 3, 4 and 5) with sealed edges and an embossed or other related reflective surface that is completely protected from environmental exposure and a multilayered assembly that is highly resistant to delamination. After attachment to washable or dry cleanable clothing such cut and sealed holograms stay attached longer than the ordinary useful life of the clothing.

Laser cut and sealed holographic materials have thus far produced the best and most abrasion and moisture resistant seals capable of outlasting the substrates on which they are attached under ordinary conditions of use. Their edges are also the smoothest and most consistently and completely sealed.

Methods of attaching all of the cut holographic materials of the present invention to various substrates alone or in combination with various graphics and ornamental enhancements are fully described in my copending application Ser. No. 883,285.

The processes and products of the invention disclosed herein represent preferred embodiments of the invention. Many other variations are possible but are impossible to disclose in their entirety. It should also be understood that the words and drawings used are merely descriptive and illustrative and are not intended as exact representations of or inflexible limitations on the spirit and scope of the invention disclosed herein which can only be measured by the legally valid scope of the appended claims.

I claim:

1. Edge sealed holographic products suitable for attachment to a substrate comprising a transparent moisture impermeable abrasion resistant plastic top layer, a moisture impermeable adhesive bottom layer, an intermediate reflective layer of a metallic or nonmetallic material which engages the plastic top layer to form a surface capable of reflecting a multi-colored image or pattern through the said top layer in the presence of light, and a seal along the entire perimeter of the assembly wherein the said seal was produced by a hot cutting tool and is capable of preventing separation of the said three layers of said assembly by either ordinary wear and tear or penetration by moisture between the layers before and after said assembly is attached to a substrate.

2. The holographic product of claim 1 wherein the seal at the perimeter is provided by cutting with a hot-tipped cutting tool.

3. The holographic product of claim 1 wherein the seal at the perimeter is provided by stamping with a heated die.

4. The holographic product of claim 1 wherein the seal at the perimeter is provided by cutting with a laser beam.

5. The holographic product of claim 1 wherein said hot cutting tool is a steel rule die.

6. The holographic product of claim 1 wherein the seal at the perimeter is provided by cutting with a $CO_2$ laser.

7. The holographic product of claim 1 wherein the said holographic product is an embossed hologram.

8. The holographic product of claim 1 wherein the said holographic product is a diffraction grating.

9. The holographic product of claim 1 wherein the said intermediate layer of the said holographic product is produced from a microetched master.

10. The holographic product of claim 1 wherein the said reflective layer is metallic substance which engages the said top layer to form an embossed surface.

11. An process for producing edge sealed holographic products for attachment to a substrate which comprises cutting and sealing the edges of said product out of a sheet of holographic film in the desired configuration with a hot cutting tool wherein said film consists of an interfaced assembly comprising a transparent moisture impervious abrasion resistant plastic top layer, a moisture impervious adhesive bottom layer and an intermediate layer of a reflective material which engages the said plastic top layer to form a surface capable of reflecting a multi-colored image or pattern through the said top layer in the presence of light wherein said sealing prevents the separation of the three layers by either ordinary wear and tear or penetration by moisture between the layers before attachment to a substrate.

12. The process of claim 11 wherein the said cutting and sealing is carried out with a hot-tipped cutting tool.

13. The process of claim 11 wherein the said cutting and sealing is carried out with a heated die.

14. The process of claim 11 wherein the said cutting and sealing is carried out with a laser beam.

15. The process of claim 11 wherein said hot cutting tool is a steel rule die.

16. The process of claim 11 wherein said hot cutting tool is a $CO_2$ laser.

17. The process of claim 11 wherein said interfaced assembly is an embossed hologram.

18. The process of claim 11 wherein said interfaced assembly is a diffraction grating.

19. The process of claim 11 wherein the said intermediate layer of the said interfaced assembly is produced from a microetched master.

20. The process of claim 11 wherein said reflective material is a metallic substance which engages the top layer to form an embossed surface.

21. Edge sealed holographic products suitable for attachment to a substrate comprising a transparent moisture impermeable adhesive bottom layer, an intermediate surface or layer on the underside of said top layer capable of reflecting a multi-colored image or pattern through the said top layer in the presence of light, and a seal along the cut edges of the assembly wherein the said seal was produced by a hot cutting tool and is capable of resisting separation of the said layers of said assembly by either ordinary wear and tear or penetration by moisture between the said layers before and after said assembly is attached to a substrate.

* * * * *

UNITED STATES PATENT AND TRADEMARK OFFICE
CERTIFICATE OF CORRECTION

PATENT NO. : 5,314,767
DATED : May 24, 1994
INVENTOR(S) : Janice W. Bussard

It is certified that error appears in the above-identified patent and that said Letters Patent is hereby corrected as shown below:

Claim 12, line 32: Insert --abrasion resistant plastic top layer, a moisture impermeable-- between the words "impermeable" and "adhesive".

Signed and Sealed this

Twenty-third Day of December, 1997

Attest:

BRUCE LEHMAN

*Attesting Officer*    *Commissioner of Patents and Trademarks*